US006810123B2

(12) United States Patent
Farris et al.

(10) Patent No.: US 6,810,123 B2
(45) Date of Patent: *Oct. 26, 2004

(54) ROLLING CODE SECURITY SYSTEM

(75) Inventors: Bradford L. Farris, Chicago, IL (US); James J. Fitzgibbon, Streamwood, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/215,900

(22) Filed: Aug. 9, 2002

(65) Prior Publication Data

US 2002/0191794 A1 Dec. 19, 2002

Related U.S. Application Data

(63) Continuation of application No. 09/981,433, filed on Oct. 17, 2001, which is a continuation of application No. 09/489,073, filed on Jan. 21, 2000, which is a division of application No. 08/873,149, filed on Jun. 11, 1997, now Pat. No. 6,154,544, which is a continuation of application No. 08/446,886, filed on May 17, 1995, now abandoned.

(51) Int. Cl.[7] .................................................. H04L 9/00
(52) U.S. Cl. ................... 380/262; 340/825.72; 341/173
(58) Field of Search ................................ 380/262, 239, 380/270, 46; 341/173–174, 181, 176–177; 340/5.61, 5.64, 5.71, 5.72, 5.2, 5.65, 5.8, 825.72; 375/135–136, 137, 295

(56) References Cited

U.S. PATENT DOCUMENTS

| | | | |
|---|---|---|---|
| 3,906,348 A | | 9/1975 | Willmott |
| 4,037,201 A | | 7/1977 | Willmott |
| 4,178,549 A | * | 12/1979 | Ledenbach et al. ......... 375/238 |
| 4,529,980 A | | 7/1985 | Liotine et al. |
| 4,535,333 A | | 8/1985 | Twardowski |
| 4,638,433 A | | 1/1987 | Schindler |
| 4,653,076 A | * | 3/1987 | Jerrim et al. ............... 375/367 |
| 4,750,118 A | | 6/1988 | Heitschel et al. |
| 4,804,938 A | * | 2/1989 | Rouse et al. ........... 340/310.06 |
| 4,988,992 A | | 1/1991 | Heitschel et al. |
| 5,528,621 A | * | 6/1996 | Heiman et al. ............. 375/133 |
| 5,530,697 A | * | 6/1996 | Watanabe .................... 370/342 |
| 6,154,544 A | * | 11/2000 | Farris et al. ................. 380/262 |

* cited by examiner

*Primary Examiner*—Gilberton Barron
*Assistant Examiner*—Hosuk Song
(74) *Attorney, Agent, or Firm*—Fitch, Even, Tabin & Flannery

(57) ABSTRACT

A rolling code transmitter is useful in a security system for providing secure encrypted RF transmission comprising an interleaved trinary bit fixed code and rolling code. A receiver demodulates the encrypted RF transmission and recovers the fixed code and rolling code. Upon comparison of the fixed and rolling codes with stored codes and determining that the signal has emanated from an authorized transmitter, a signal is generated to actuate an electric motor to open or close a movable barrier.

26 Claims, 16 Drawing Sheets

Fig. 5B

ROLLING CODE SECURITY SYSTEM

This is a continuation of prior application No. 09/981,433, filed Oct. 17, 2001, which is a continuation of prior application No. 09/489,073, filed Jan. 21, 2000, which is a divisional application of 08/873,149, filed Jun. 11, 1997, now U.S. Pat. No. 6,154,544, which is a continuation of application No. 08/446,886, filed May 17, 1995, now abandoned, all of which are hereby incorporated herein by reference in their entirety.

BACKGROUND OF THE INVENTION

The invention relates in general to security systems which allow operation upon the receipt of a properly coded signal. More particularly, the invention relates to a security system or to a barrier operator system, such as a garage door operator, employing a transmitter and a receiver which communicate via code streams having at least a portion thereof which changes with multiple operation of the device.

It is well known in the art to provide garage door operators or other barrier operators which include an electric motor connectable through a transmission to a door or other movable barrier which is to be opened and closed. Since many of these systems are associated with residences, as well as with garages, it is important that opening of the barrier be permitted only by one who is authorized to obtain entry to the area which the barrier protects. Some garage door operator systems have in the passed employed mechanical lock and key arrangements associated with electrical switches mounted on the outside of the garage. While these systems enjoy a relatively high level of security, they are very inconvenient to use for a person because it necessitates them exiting their vehicle in order to send the command to open the garage door. This also may present some danger to people when the exit the relative security of their vehicle if someone may be waiting to do injury to them.

It is also well known to provide radio-controlled garage door operators which include a garage door operator unit having a radio receiver and a motor connected to be driven from the radio receiver. The radio receiver is adapted to receive radio frequency signals or other electromagnetic signals having particular signal characteristics which, when received, cause the door to be opened. More recently, such transmitter and receiver systems have become relatively more sophisticated in that they use radio transmitters which employ coded transmissions of multiple or three-valued digits, also known as "trinary bits" or other serial coded transmission techniques. Among these systems are U.S. Pat. No. 3,906,349 to Willmott, which employs a transmitter and receiver system wherein a plurality of mechanical switches may be used to set a stored authorization code.

U.S. Pat. No. 4,529,980 to Liotine et al. discloses a transmitter and receiver combination for use in a device such as a garage door operator wherein the transmitter stores an authorization code which is to be transmitted to and received by the receiver via a radio frequency link. In order to alter or update the authorization code contained within the transmitter, the receiver is equipped with a programming signal transmitter or light emitting diode which can send a digitized optical signal back to the transmitter where it is stored. Other systems also employing encoded transmissions are U.S. Pat. Nos. 4,037,201, 4,535,333, 4,638,433, 4,750,118 and 4,988,992.

While each of these devices have provided good security for the user, it is apparent that persons wishing to commit property or person-related crimes have become more sophisticated as well. It is known in the security industry today that devices are being made available that can intercept or steal rolling code.

Transequatorial Technology, Inc. sells integrated circuit code hopping encoders identified as Keeloq Model NTQ105, NTQ115, NTQ125D and NTQ129. Some of the keeloq code hopping encoders generate serial codes having fixed portions, i.e., which do not change with repeated actuation of the encoding portion of the chip and rolling code portions which alter with each actuation of the encoding portion of the chip. In order to avoid, however, having the problem of the encoding portion of the chip having been inadvertently enabled and causing the rolling code to be altered on successive enabling attempts thereby leading to a rolling code which is transmitted and not recognized by a receiver, the keeloq code hopping encoders provide a window forward system, that is they are operable with systems having code receivers which recognize as a valid code not a single rolling code, but a plurality of rolling codes within a certain code window or window of values which are the values which would be generated on a relatively small number of switch closures as compared to the total number of rolling codes available. The problem with such a system, however, might arise if a user was away for a period of time or had inadvertently caused codes to be transmitted excluding the number of codes normally allowed within the valid forward code window. In that case, the rolling code would not be recognized by the receiver and the user could not gain entry without taking other measures to defeat the locking system or the garage door operator system which might involve the intervention of a trained engineer or technician.

Texas Instruments also has a prior system identified as the Mark Star TRC1300 and TRC1315 remote control transmitter/receiver combination. The system involves the use of a rolling code encoder which increments or rolls potentially the entire code, that is it does not leave a fixed portion. The system also includes a forward windowing function which allows an authorized user to be able to cause the receiver to be enabled within a limited number of key pushes. Like the keeloq system, if the forward window is exceeded, the Texas Instruments system must be placed in a learn mode to cause the system to relearn the code. In order to place the system into the learn mode, the person must obtain direct access to the receiver to cause a programming control system associated with the receiver to be hand actuated causing the receiver to enter a learn mode. Once the receiver has learned the new code, the receiver will then construct a new valid forward code window within which valid rolling codes may be received. The problem, of course, with such a system that if, for instance in a garage door operator, the only portal of entry to the garage door is through the overhead door controlled by the garage door operator, the user will not be able to obtain entry to the garage without possibly having to do some damage to the structure. This problem is sometimes referred to in the industry as a "vaulted garage."

What is needed is an economical encoding system which provides good security by using a rolling code, but which enables a user of the system to proceed via a gradually degraded pathway in the event that the receiver detects a signal condition indicative of what might be a lack of security.

SUMMARY OF THE INVENTION

The invention relates in general to an electronic system for providing remote security for entry of actuation of a particular device. Such a system may include a transmitter and receiver set, for instance with a hand-held transmitter and a receiver associated with a vehicle such as an automobile or the like. The transmitter, upon signaling the receiver, causing the vehicle to start up or to perform other functions. The system may also be useful in a barrier operator system such as a garage door operator by allowing the garage door to be opened and closed in a relatively secure fashion while preventing persons who may be intercepting the radio frequency signals from being able to, although unauthorized, cause the vehicle to begin running or to allow access to the garage.

The system includes a transmitter generally having means for developing a fixed code and a rolling or variable code. The rolling or variable code is changed with each actuation of the transmitter. The fixed code remains the same for each actuation of the transmitter. In the present system, the transmitter includes means for producing a 32-bit frame comprising the fixed portion of the code and a second 32-bit frame comprising the variable portion of the code. The 32-bit rolling code is then mirrored to provide a 32-bit mirrored rolling code. The 32-bit mirrored rolling code then has its most significant bit "deleted" by setting it to zero. The transmitter then converts the 32-bit fixed code and the mirrored variable code to a three-valued or trinary bit fixed code and a three-valued or trinary bit variable code or rolling code.

To provide further security, the fixed code and the rolling codes are shuffled so that alternating trinary bits are comprised of a fixed code bit and a rolling code bit to yield a total of 40 trinary bits. The 40 trinary bits are then packaged in a first 20-trinary bit frame and a second 20-trinary bit frame which have proceeding them a single synchronization and/or identification pulse indicating the start of the frame and whether it is the first frame or the second frame. Immediately following each of the frames, the transmitter is placed into a quieting condition to maintain the average power of the transmitter over a typical 100 millisecond interval within legal limits promulgated by the United States Federal Communications Commission. The first trinary frame and the second trinary frame are used to modulate a radio frequency carrier, in this case via amplitude modulation to produce an amplitude modulated encrypted signal. In a preferred embodiment, the radio frequency signal is amplitude modulated. The amplitude modulated signal is then launched and may be received by an AM receiver. In the preferred embodiment, the AM receiver receives the amplitude modulated signal, demodulates it to produce a pair of trinary bit encoded frames. The trinary bits in each of the frames are converted on the fly to 2-bit or half nibbles indicative of the values of the trinary bits which are ultimately used to form two 16-bit fixed code words and two 16-bit variable code words. The two 16-bit fixed code words are used as a pointer to identify the location of a previously stored rolling code value within the receiver. The two 16-bit rolling code words are concatenated by taking the 16-bit word having the more significant bits, multiplying it by $3^{10}$ and then adding it to the second of the words to produce a 32-bit encrypted rolling code. In order to make certain that if the transmitter was inadvertently actuated a number of times, the authorized user can still start his car or gain entry to his garage. The 32-bit encrypted code is then compared via a binary subtraction with the stored rolling code. If the 32-bit code is within a window or fixed count, in the present embodiment 1000, the microprocessor produces an authorization signal which is then responded to by other portions of the circuit to cause the garage door to open or close as commanded. In the event that the code is greater than the stored rolling code, plus 1000, indicative of a relatively large number of incrementations, the user is not locked out of the garage, out is allowed to provide further signals or indicia to the receiver that he is an authorized user without any significant degradation of the security. This is done by the receiver entering an alternate mode requiring two or more successive valid codes to be received, rather than just one. If the two or more successive valid codes are received, the garage door will open. However, in order to prevent a person who has previously or recently recorded a recent valid code from being able to obtain access to the garage, a trailing window, in this case starting at a count of 300 less than the present stored count and including all code values between the present stored count and 300 less is compared to the received code. If the received code is within this backward window, the response of the system simply is to take no further action, nor to provide authorization during that code cycle on the assumption that the code has been purloined.

Thus, the present system provides important advantages over the previous garage door operator systems and even previous rolling code systems. The system provides a multiple segmented windowed system which provides a valid code window, a second relatively insecure code window in which two successive valid codes must be received and finally a window in which no valid codes are recognized due to the likelihood of the receiver having been stolen.

It is a principal object of the present invention to provide a security system involving a radio frequency transmitter and receiver wherein multiple security conditions may exist requiring different levels of signal security.

It is another object of the present invention to provide a secure radio transmitter receiver system which may rapidly and easily decode a relatively large code combination.

Other advantages of the invention will become obvious to one of ordinary skill in the art upon a perusal of the following specification and claims in light of the accompanying drawings.

DETAILED DESCRIPTION OF THE PREFERRED EMBODIMENT

Figure 1:
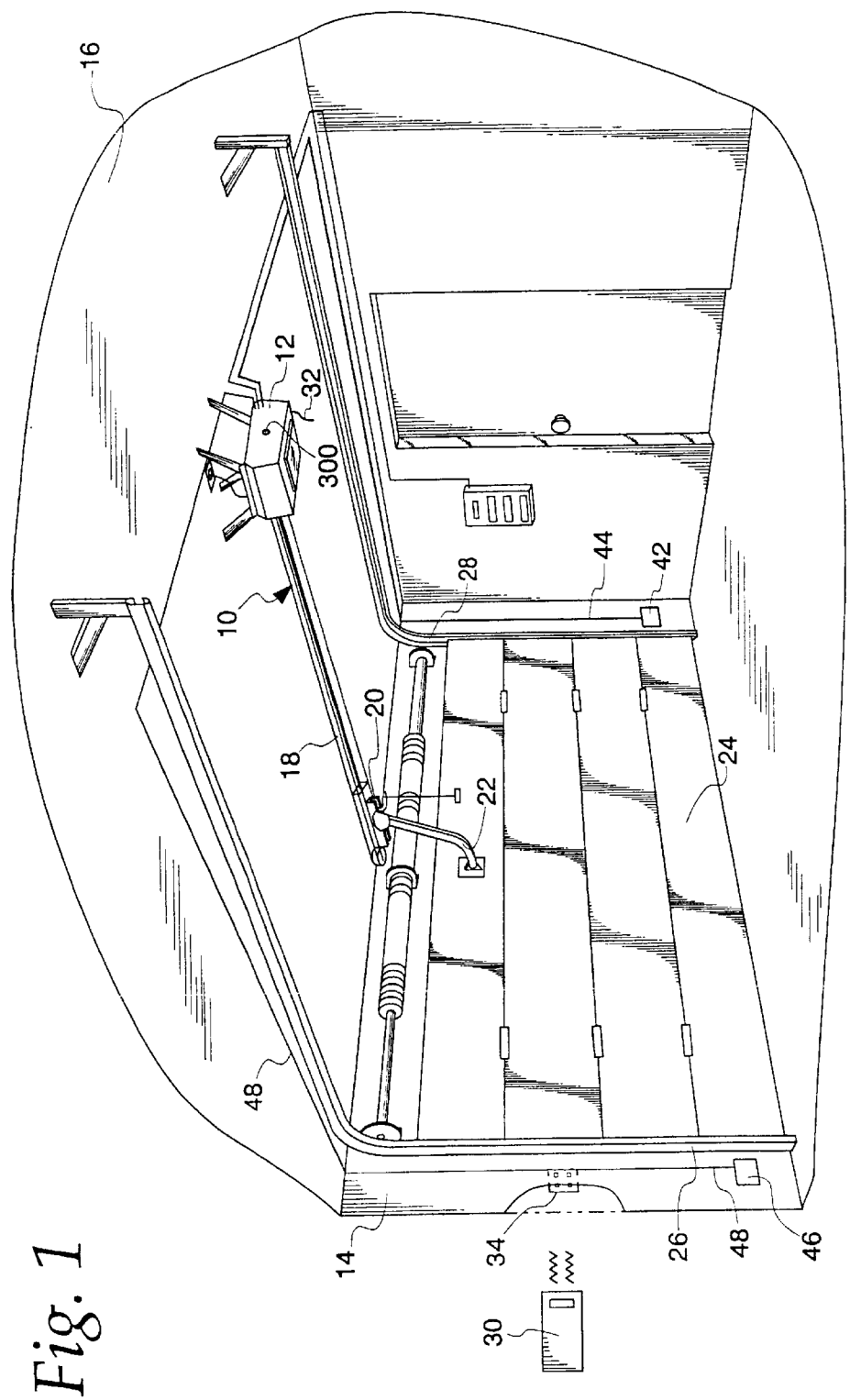
FIG. 1 is a perspective view of an apparatus for moving a barrier or garage embodying the present invention.

Referring now to the drawings and especially to FIG. 1, more specifically a movable barrier door operator or garage door operator is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicate via radio frequency transmission with the antenna 32 of the head unit 12.

An optical emitter 42 is connected via a power and signal line 44 to the head unit. An optical detector 46 is connected via a wire 48 to the head unit 12.

Figure 2:
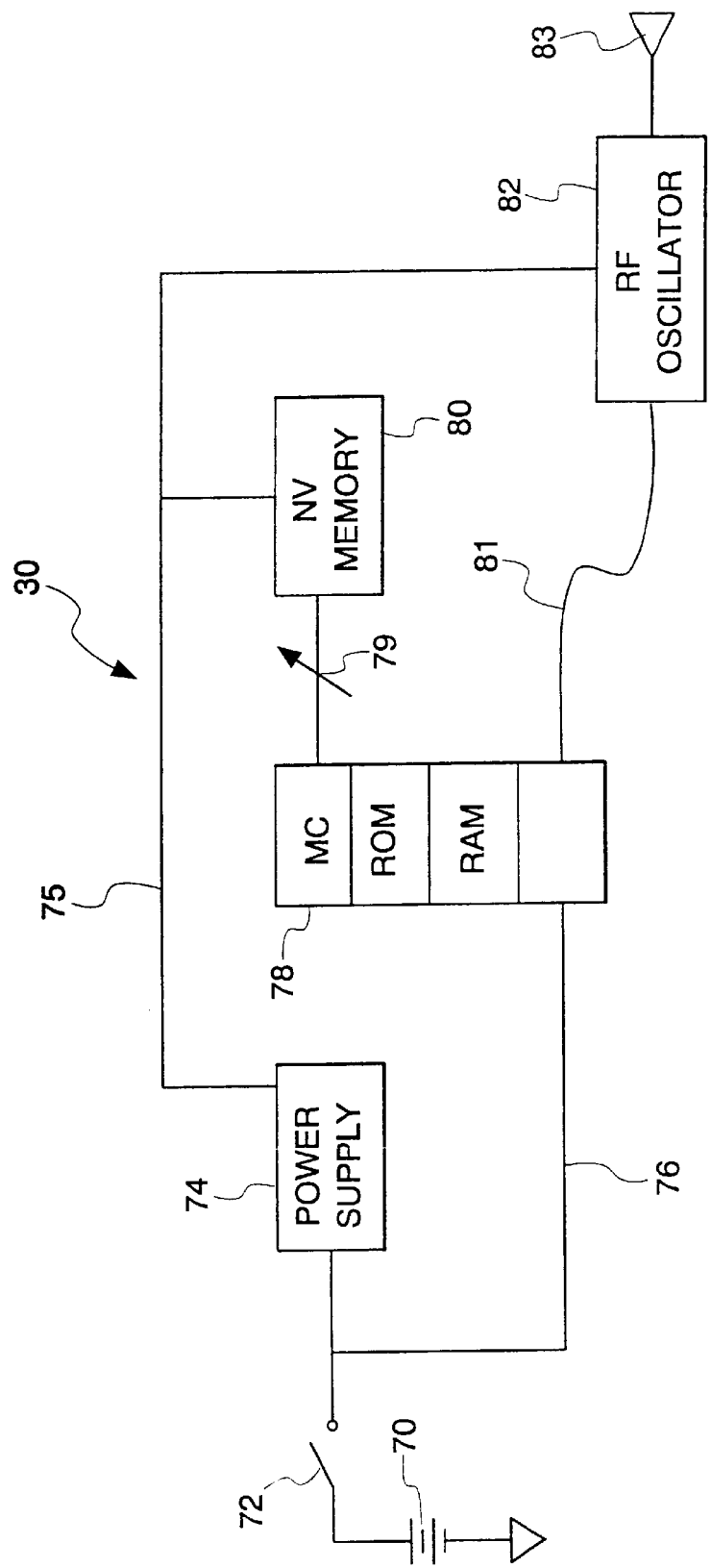
FIG. 2 is a block diagram of a transmitter for use with a garage door operator of FIG. 1.
Figure 5A:
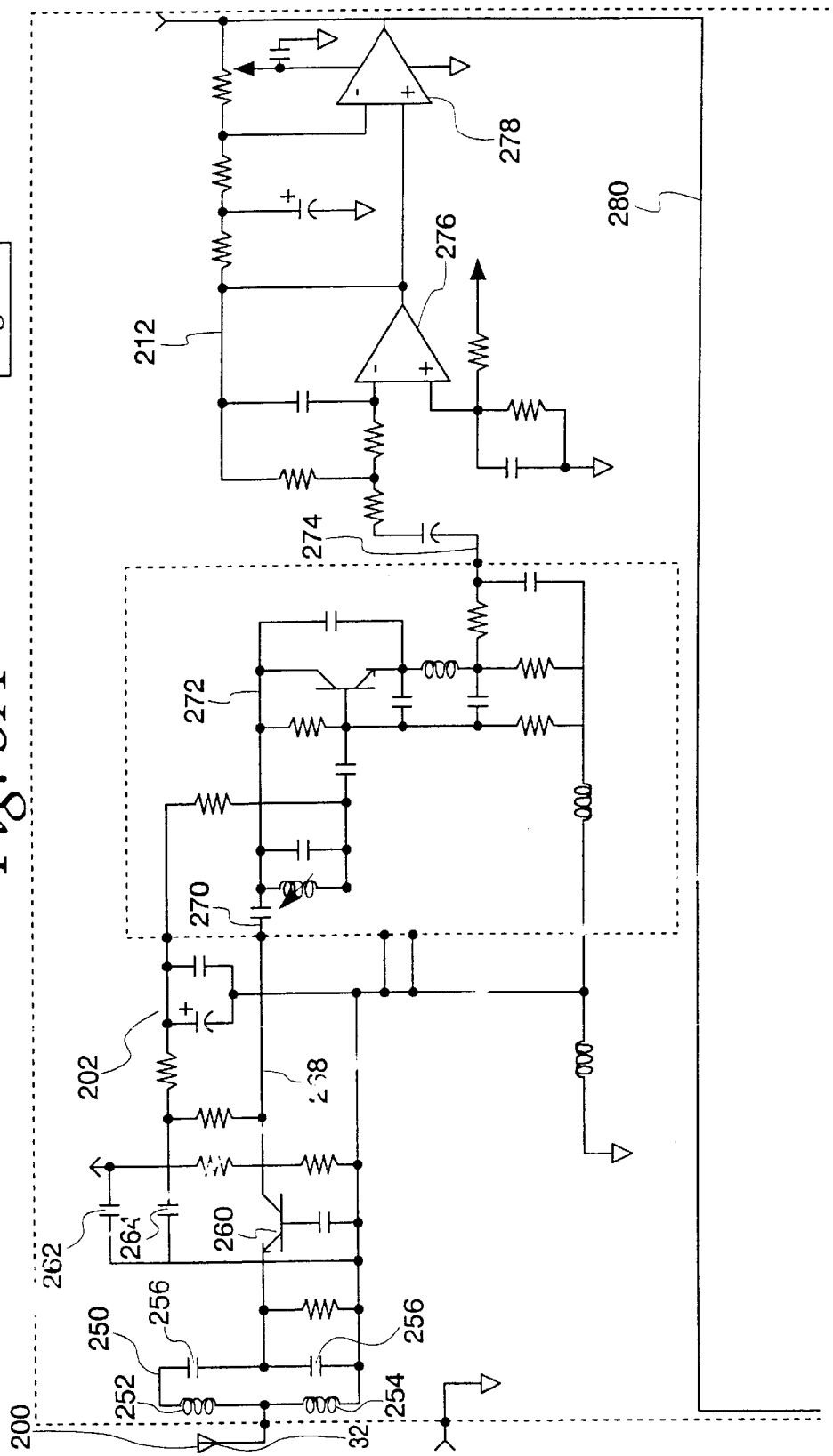
FIG. 5 is a schematic diagram of the receiver shown in FIG. 3.
Figure 5B:
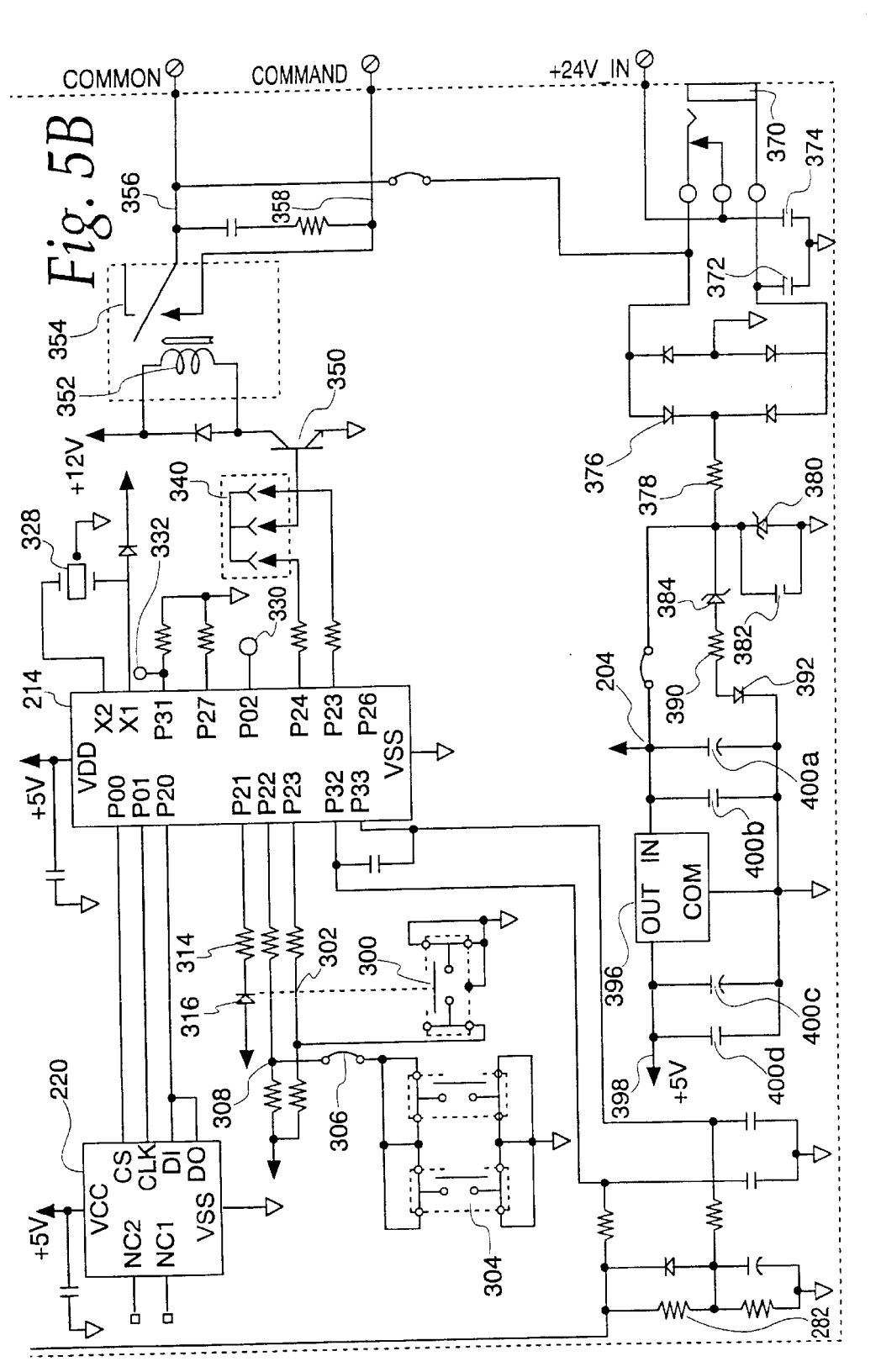

Referring now to FIG. 2, the transmitter 30 is shown therein in general and includes a battery 70 connected by a pushbutton switch 72 to a power supply 74 which is coupled via leads 75 and 76 to a microcontroller 78. The microcontroller 78 is connected by a serial bus 79 to a non-volatile memory 80. An output bus 81 connects the microcontroller to a radio frequency oscillator 82. The microcontroller 78 produces ceded signals when the button 72 is pushed causing the cutout of the RF oscillator 82 to be amplitude modulated to supply a radio frequency signal at an antenna 83 connected thereto. More specifically, as shown in FIG. 5, details of the transmitter 30 are shown therein, including a plurality of switches 72. When switch 72 is closed, power is supplied through a diode 100 to a capacitor 102 to supply a 7.1 volt voltage at a lead 103 connected thereto. A light emitting diode 104 indicates that the transmitter button has been pushed and provides a voltage to a lead 105 connected thereto. A Zener diode 106 provides voltage regulation and causes the back biased diode 107 to cause the crystal 108 to be energized, thereby energizing the microcontroller 78, a Zilog 125C0113 8-bit microcontroller in this embodiment. The signal is also sent via a resistor 110 through a lead 111 to a P32 pin of the microcontroller 78. Likewise, when a switch 113 is closed, current is fed through a diode 114 to the lead 103 also causing the crystal 108 to be energized, powering up the microcontroller at the same time that pin P33 of the microcontroller is pulled up. Similarly, when a switch 118 is closed, power is fed through a diode 119 to the crystal 108 as well as pull up voltage being provided through a resistor 120 to the pin P31. It should also be appreciated that pin P34 of the microcontroller is configured via a connection with the resistor 123 to be an RS232 input port 124.

The microcontroller is coupled via the serial bus 79 to a chip select port, a clock port and a DI port to which and from which serial data may be written and read and to which addresses may be applied. As will be seen hereinafter in the operation of the microcontroller, the microcontroller 78 produces output signals at the lead 81, which are supplied to a resistor 125 which is coupled to a voltage dividing resistor 126 feeding signals to the lead 127. A 30-nanohenry inductor 128 is coupled to NPN transistor 129 at its vase 130. The transistor 129 has a collector 131 and an emitter 132. The collector 131 is connected to the antenna 83 which, in this case, comprises a printed circuit board, loop antenna having an inductance of 25-nanohenries, comprising a portion of the tank circuit with a capacitor 133, a variable capacitor 134 for tuning, a capacitor 135 an a capacitor 136. An 30-nanohenry inductor 139 is coupled via a capacitor 139 to ground. The capacitor has a resistor 140 connected in parallel with it to ground. When the output from lead 81 is driven high by the microcontroller, the capacitor Q1 is switched on causing the tank circuit to output a signal on the antenna 83. When the capacitor is switched off, the output to the drive the tank circuit is extinguished causing the radio frequency signal at the antenna 83 also to be extinguished.

Figure 3:
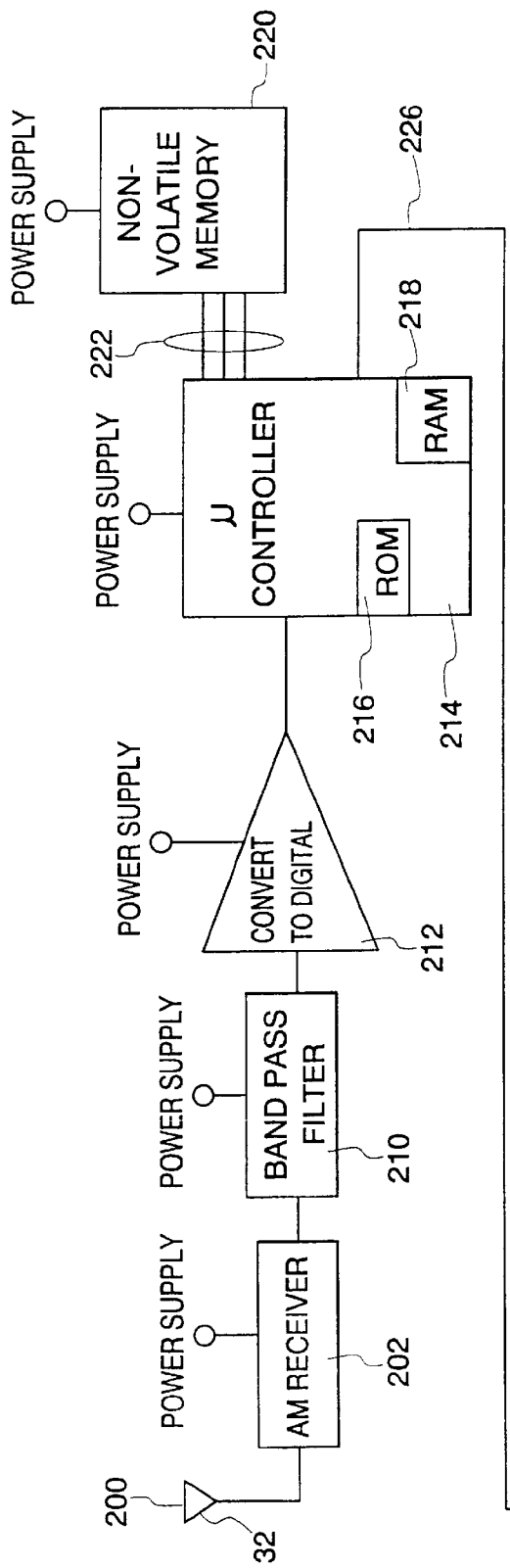
FIG. 3 is a block diagram of a receiver positioned within a head unit of the garage door operator shown in FIG. 1.
Figure 4:
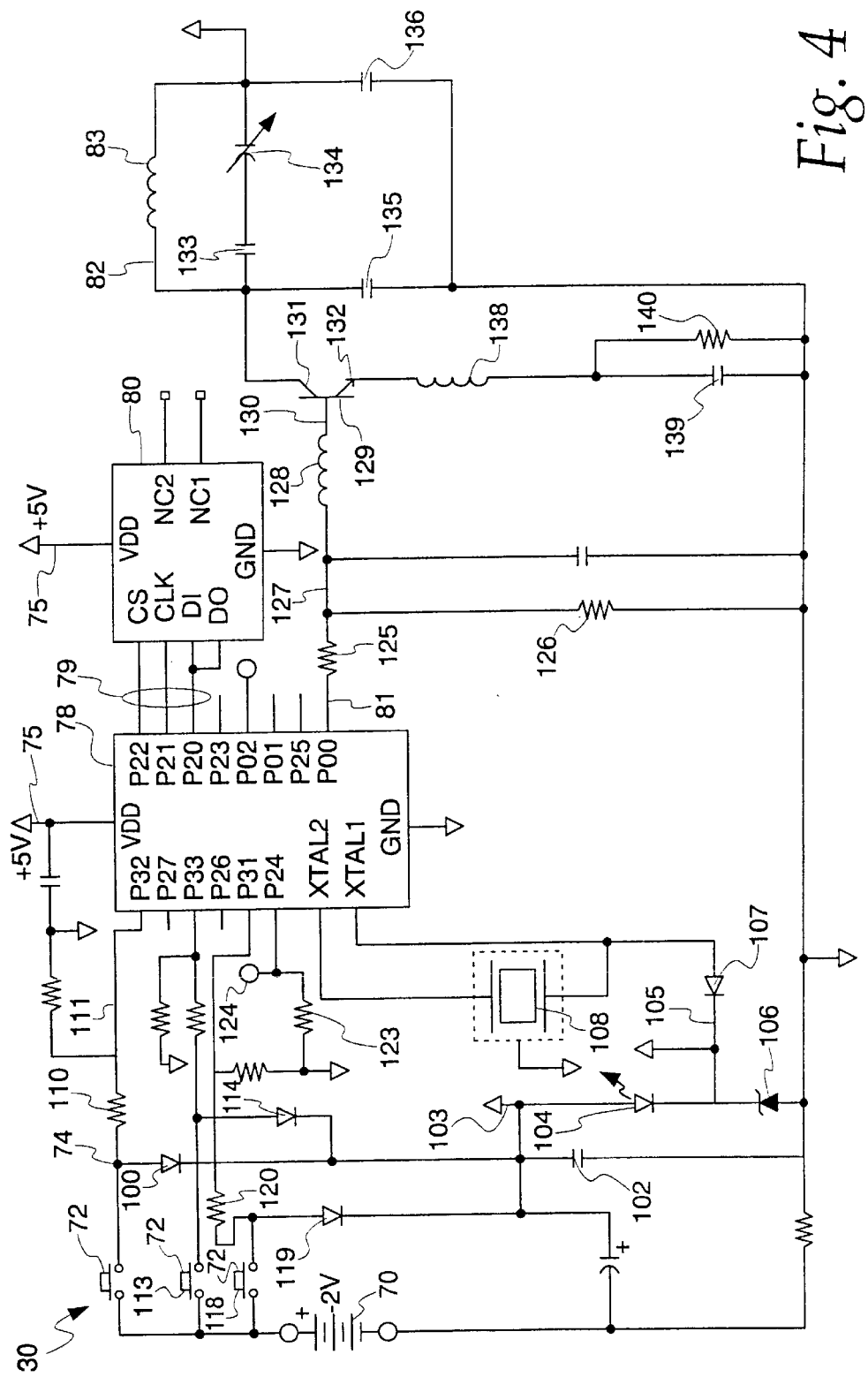
FIG. 4 is a schematic diagram of the transmitter shown in FIG. 2.

Referring now to FIG. 3, the receiver is shown therein and includes a receiver antenna 200 coupled to an amplitude modulated receiver 202 driven from a power supply 204 connectable to a source of alternating current 206. The receiver 202 provides a demodulated output via a bandpass filter 210 to an analog-to-digital converter 212 which provides input to a microcontroller 214 having an internal read-only memory 216 and an internal random-access memory 218. A serial non-volatile memory 220 is connected via a memory bus 222 to the microcontroller 214 to send and receive information thereto. The microcontroller has an output line 226 coupled to a motor controller 228 which may include a plurality of relays or other standard electromechanical features which feeds electrical current on lines 230 and 232 to an electric motor 234.

Referring row to FIG. 3 the antenna 200 coupled to a reactive divider network 250 comprised of a pair of series connected inductances 252 and 254 and capacitors 256 and 258 which supply an RF signal to a buffer amplifier having an NPN transistor 260, at its emitter 261. The NPN transistor 260 has a pair of capacitors 262 and 264 connected to it for power supply isolation. The buffer on a lead 268. The buffered RF signal is fed to an input 270 which forms part of a super-regenerative receiver 272 having an output at a line 274 coupled to the bandpass filter which provides digital output to the bandpass filter 212. The bandpass filter 212 includes a first stage 276 and a second stage 278 to provide a digital level output signal at a lead 280 which is supplied via an averaging circuit 282 to an input pin P32 of the microcontroller 214.

The microcontroller 214 may have its mode of operation controlled by a programming or learning switch 300 coupled via a line 302 to the P25 pin. A command switch 304 is coupled via a jumper 306 to a line 308 and ultimately Through a resistor to the input pin P22. A pin P21 sinks current through a resistor 314 connected to a light emitting diode 316, causing the diode to light to indicate that the receiver is active. The microcontroller 214 has a 4 MHz crystal 328 connected to it to provide clock, signals and includes an RS232 output port 332 that is coupled to the pin P31. A switch 340 selects whether constant pressure or monostable is to be selected as the output from output terminals P24 and P23 which are coupled to a transistor 350 which, when switched on, sinks current through a coil 352 of a relay 354, causing the relay to close to provide an actuating signal on a pair of leads 356 and 358 to an electric motor.

It may be appreciated that the power supply 204 may receive power from an external transformer or other AC source through a jack 370 which is connected to a pair of RJ uncoupling capacitors 372 and 374. The input signal is then set to a full-wave rectifier bridge 376 which provides an output current at a resistor 378. An 18-volt Zener diode 380 is connected between ground and the resistor 378 and includes high frequency bypass capacitor 382 connected in parallel with it. An 8.2-volt Zener diode 384 is connected in back-biased configuration to the resistor 378 to receive a signal therefrom to guarantee that at least an 8.2-volt signal is fed to a resistor 390 causing an LED 392 to be illuminated and also causing power to be supplied to a 5-volt 78LO5 voltage regulator 396. The voltage regulator 396 supplies regulated voltage to an output line 398. Filtering capacitors 400a, 400b, 400c and 400d limit the fluctuations at the power supply.

Figure 6:
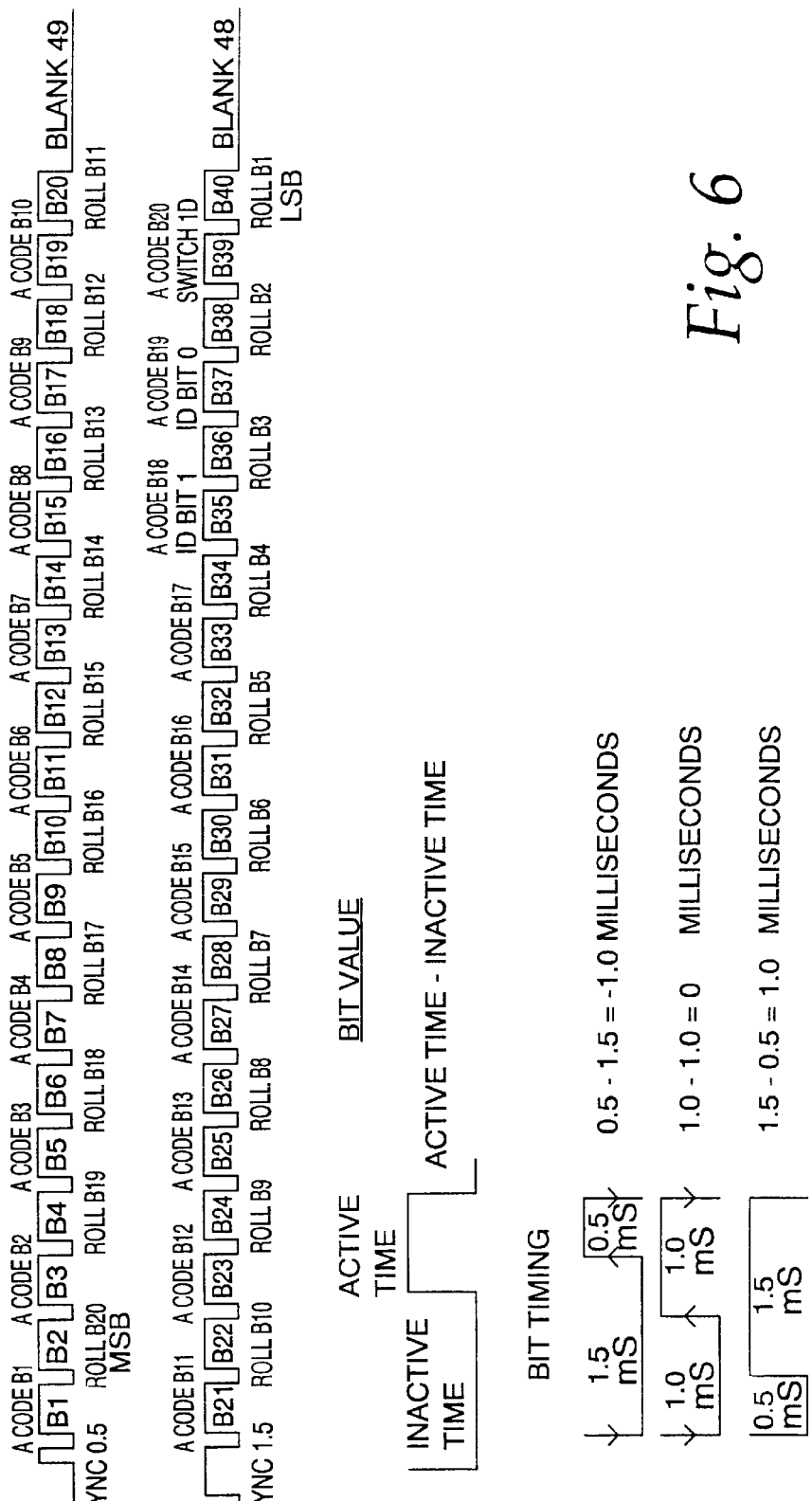
FIG. 6 is a timing diagram of signals generated by a portion of the transmitter.
Figure 7A:
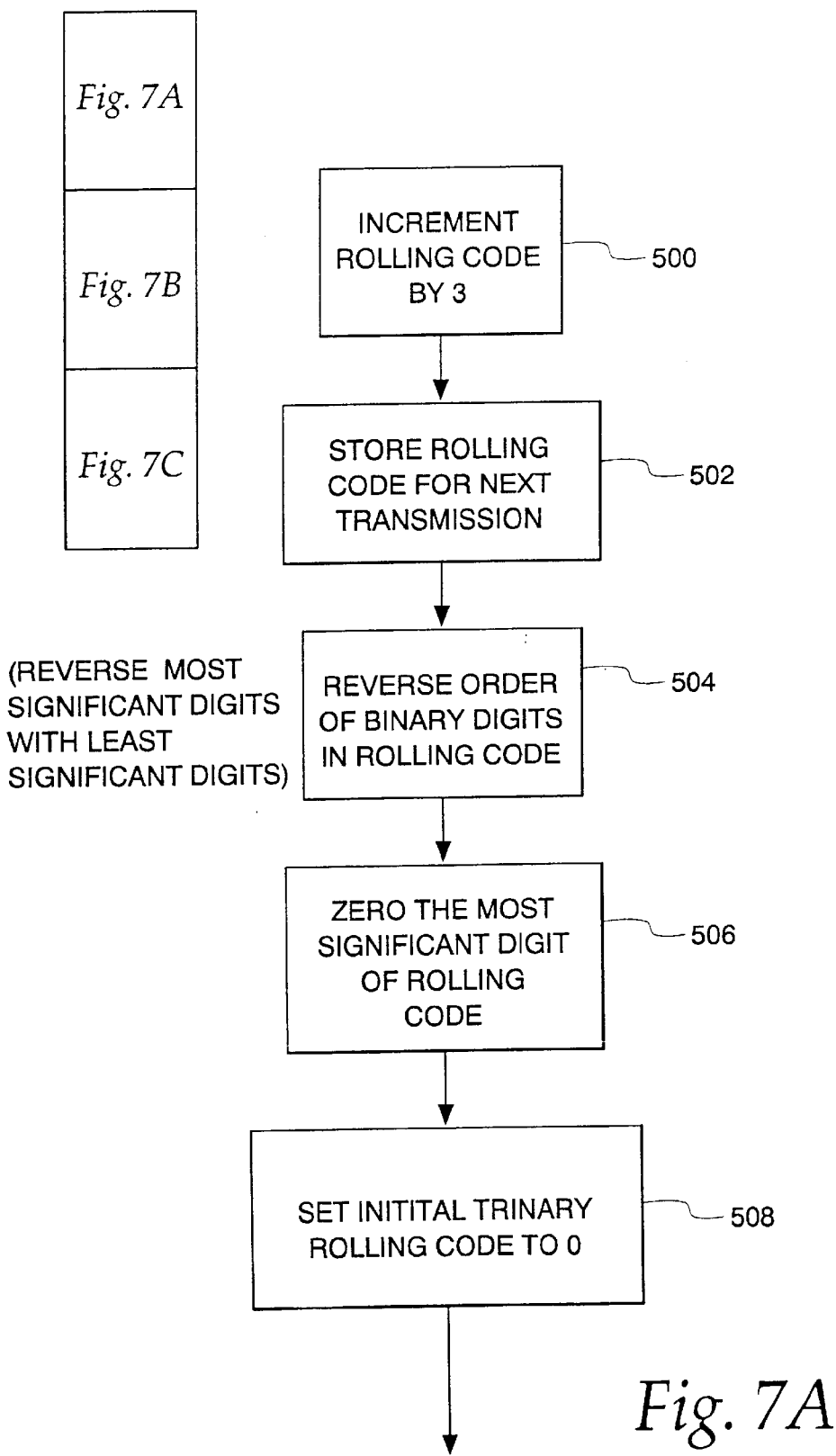
FIGS. 7A, B, and C are flow diagrams showing the operation of the transmitter.
Figure 7B:
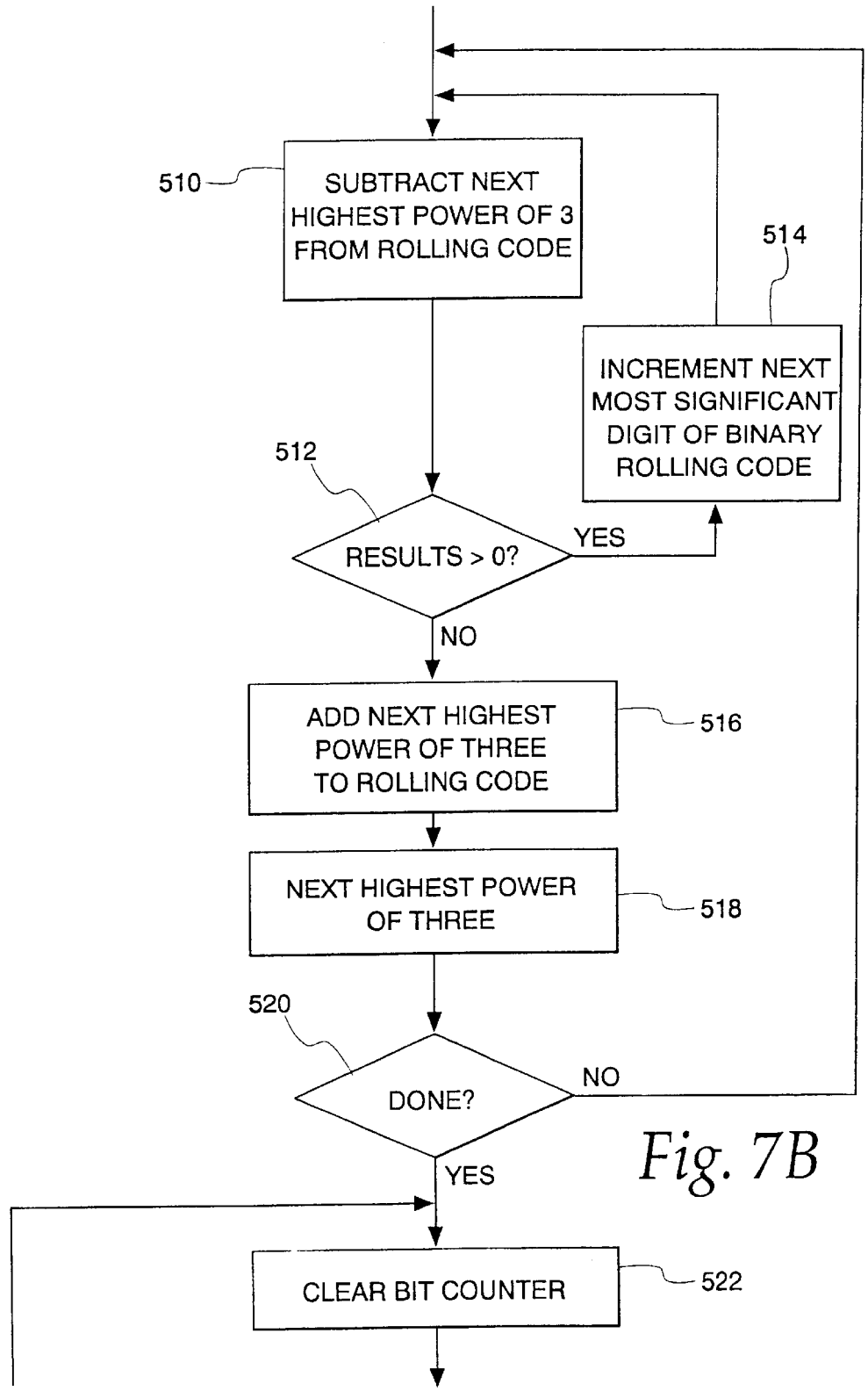
Figure 7C:
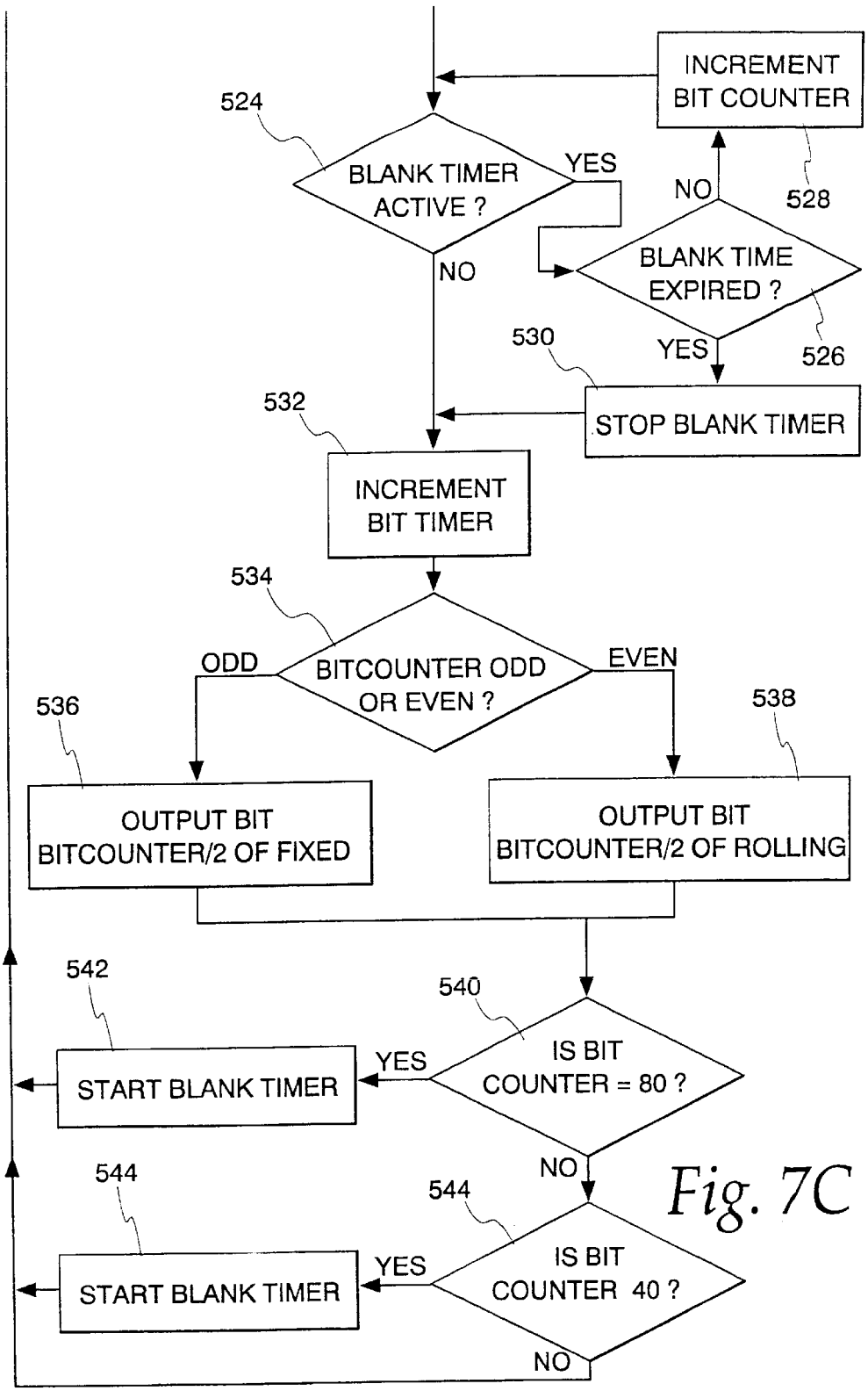

The program code listing for the transmitter is set forth at pages A-1 through A-19 and for the receiver at pages A-20 through A-51 of the attached appendix. Referring now to FIGS. 7A through 7C, the flow chart set forth therein describes the operation of the transmitter. A rolling code is incremented by three in a step 500, followed by the rolling code being stored for the next transmission from the transmitter when the transmitter button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code is set to 0. It may be appreciated that it is trinary code which is actually used to modify the radio frequency oscillator signal and the trinary code is best seen in FIG. 6. It may be noted that the bit timing in FIG. 6 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is equal to zero. If it is, the next most significant digit of the binary rolling code is incremented in a step 514, following which flow is returned to the step 510. If tie result is not greater than 0, the next highest power of 3 is added to the rolling code in the step 516. In the step 518, another highest power of 3 is incremented and in a step 520, a test is determined as to whether the rolling code is completed. If it is not, control is transferred back to step 510. If it has, control is transferred to step 522 to clear the bit counter. In a step 524, the blank timer is tested to determine whether it is active or not. If it is not, a test is made in a step 526 to determine whether the blank time has expired. If the blank time has not expired, control is transferred to a step 528 in which the bit counter is incremented, following which control is transferred back to the decision step 524. If the blank time has expired as measured in decision step 526, the blank timer is stopped in a step 530 and the bit counter is incremented in a step 532. The bit counter is then tested for odd or even in a step 534. If the bit counter is not even, control is transferred to a step 536 where the output bit of the bit counter divided by 2 is fixed. If the bit counter is even, the output bit counter divided by 2 is rolling in a step 538. The bit counter is tested to determine whether it is set to equal to 80 in a step 540. If it is, the blank timer is started in a step 542. If it is not, the bit counter is, tested for whether it is equal to 40 in a step 544. If it is, the blank timer is tested and is started in a step 544. If the bit counter is not equal to 40, control is transferred back to step 522.

Figure 8A:
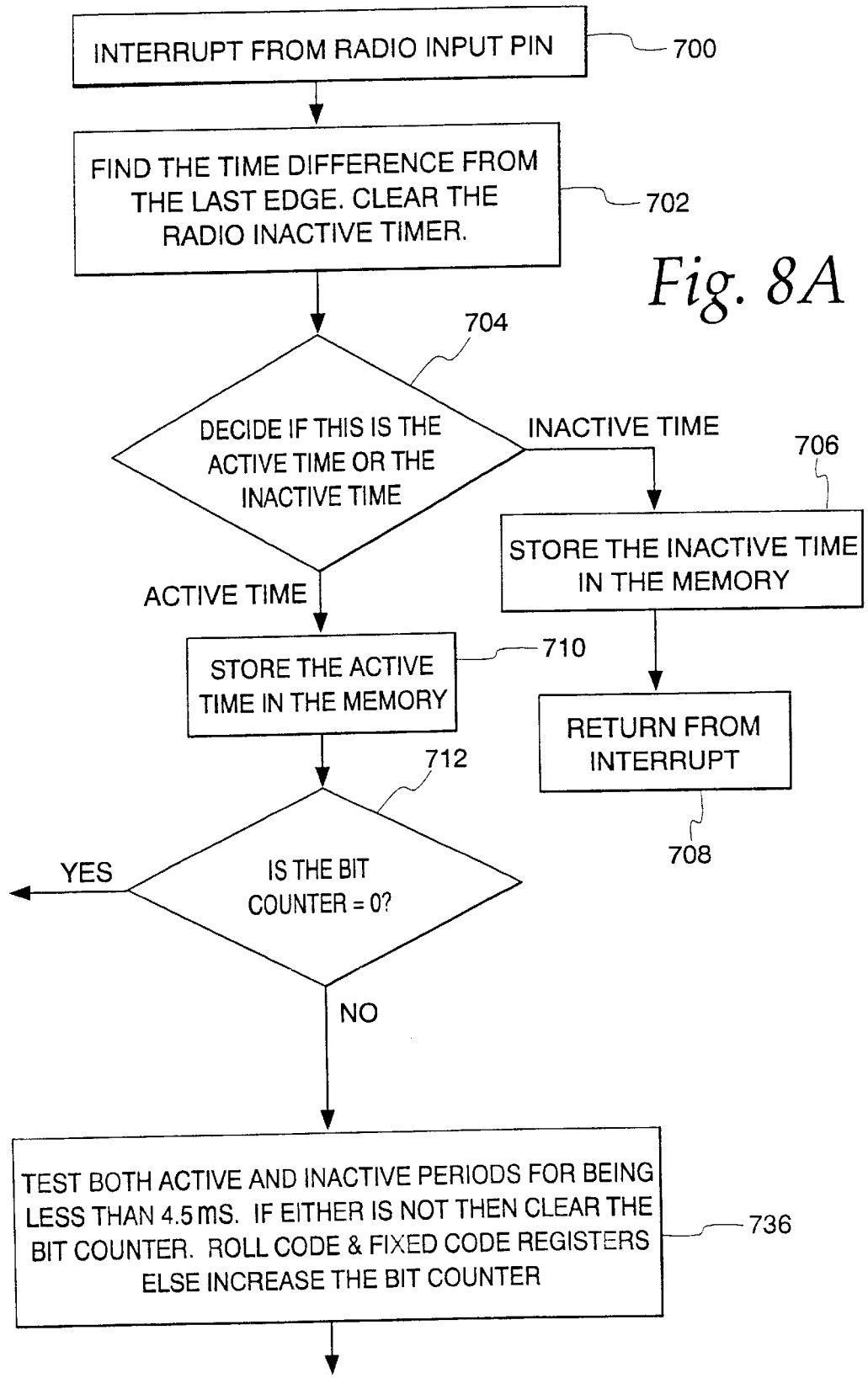
FIGS. 8A, B, C, D, E and F are flow charts showing the operation of the receiver.
Figure 8B:
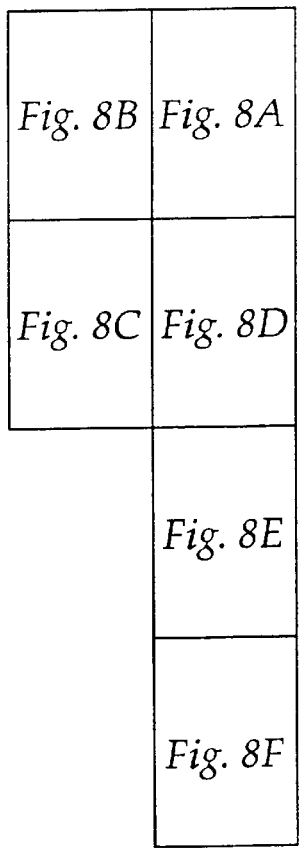
Figure 8B:
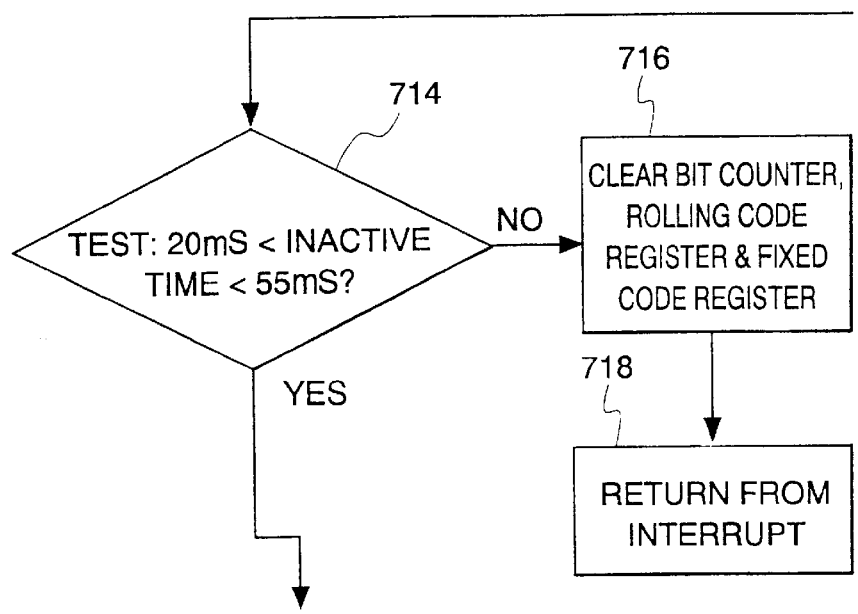

Referring now to FIGS. 8A through 8F and, in particular, to FIG. 8A, the operation of the receiver is set forth therein. In a step 700, an interrupt is detected and acted upon from the radio input pin. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

Figure 8C:
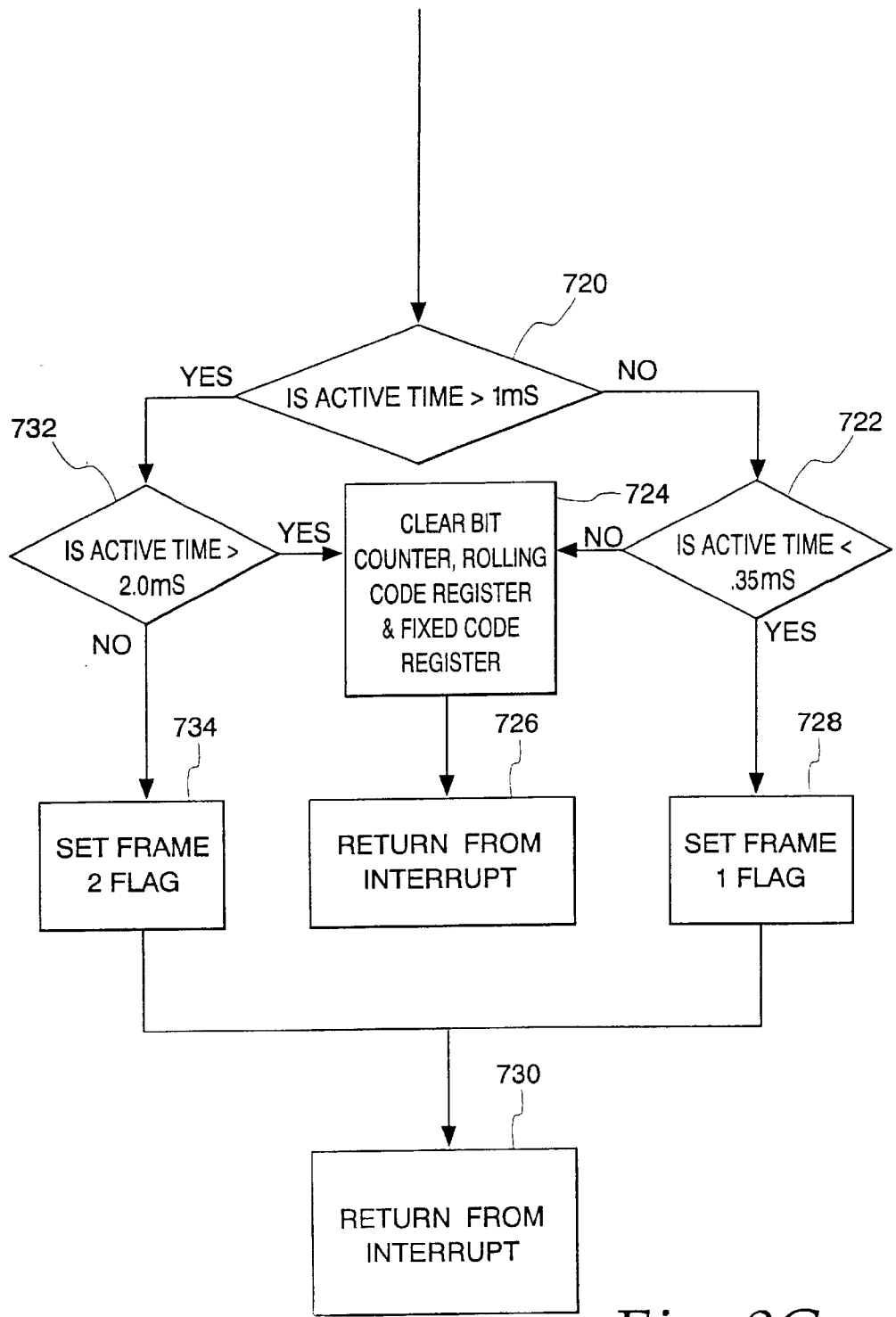

In the event that the inactive time is between 20 milliseconds and 55 milliseconds, a test is made in a step 720 to determine whether the active time is greater than 1 millisecond, as shown in FIG. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register and the return is exited in the step 726. If the active time is greater than 1 millisecond as tested in step 720, a test is made in a step 732 to determine whether the active time is greater than 2.0 milliseconds. If it is not, the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
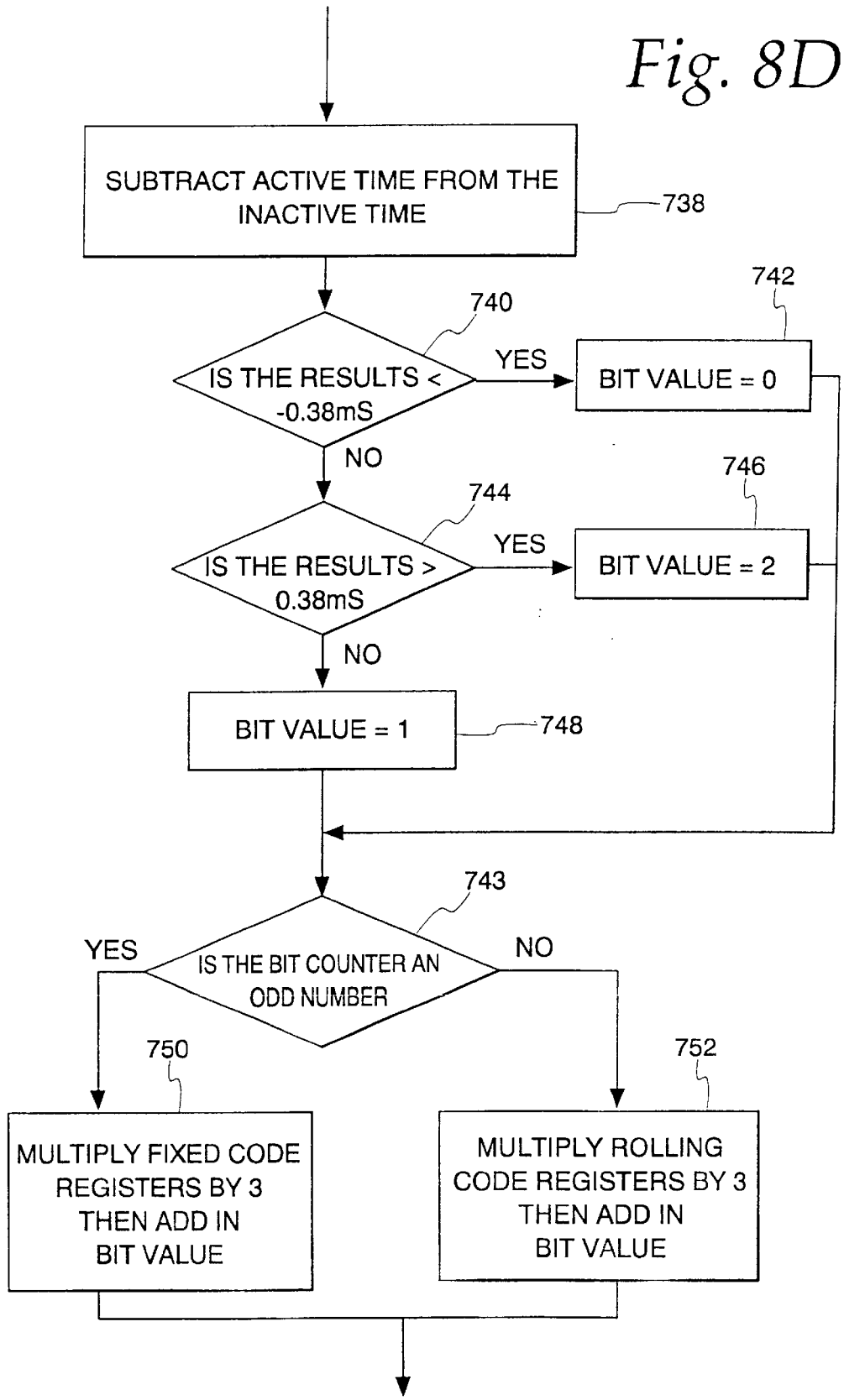

In the event that the bit counter rest in step 712 indicates that the bit counter is not 0, control is transferred to step 736, as shown in FIG. 8A. Both the active and inactive periods are tested to determine whether they are less than 4.5 milliseconds. If either is not less than 4.5 milliseconds, the bit counter is cleared as well as the rolling code register and the fixed code registers. If both are equal to greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are, the bit value is set equal to zero in step 742 and control is transferred to a decision step 743. If the results are not less than 0.38 milliseconds, a test is made in a step 744 to determine if they difference between the active time and inactive time is greater than 0.33 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even numbered bit, which would imply that it is one of the interleaved rolling code bits, is multiplied by three and then the bit value added in.

Figure 8E:
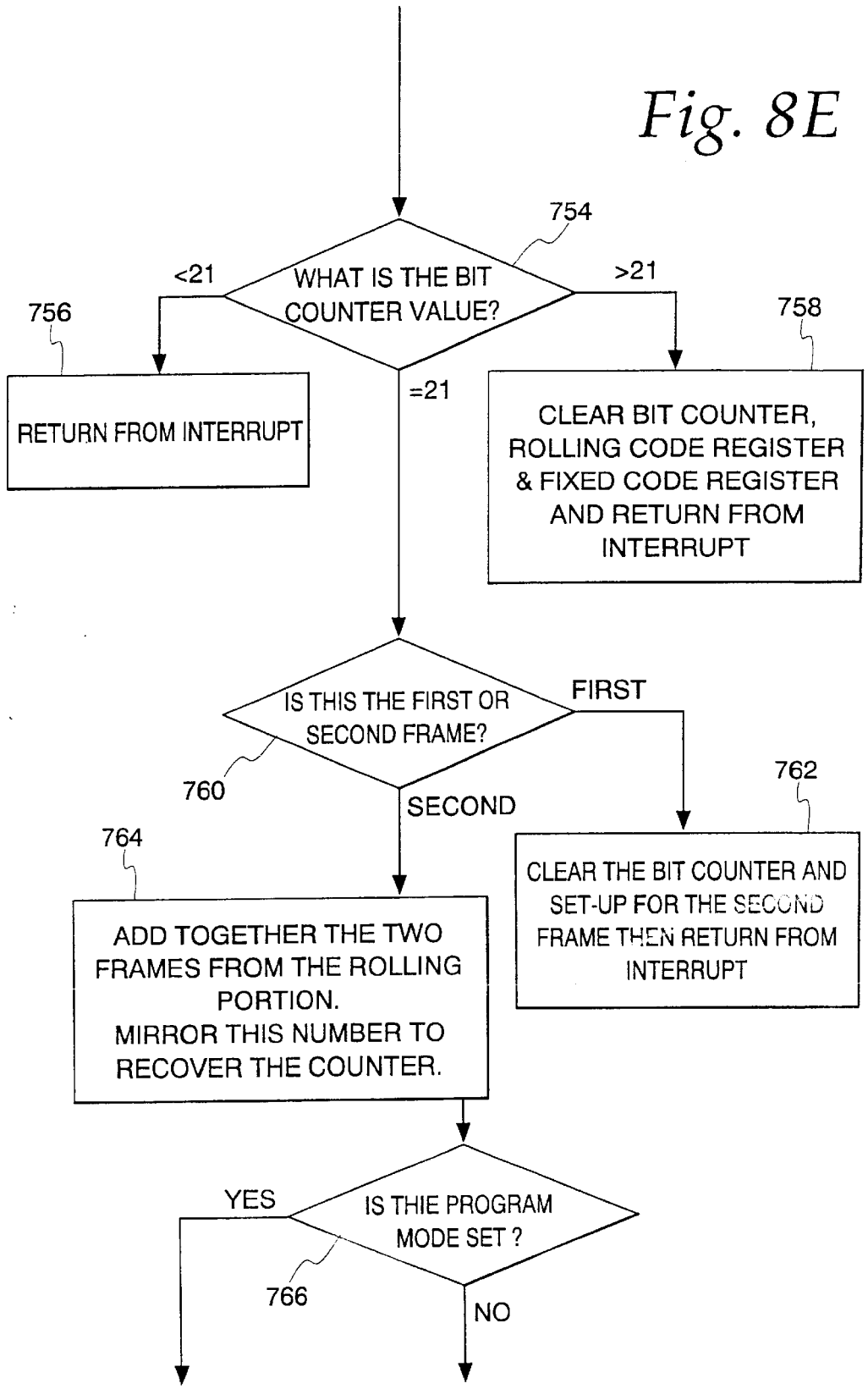
Figure 8F:
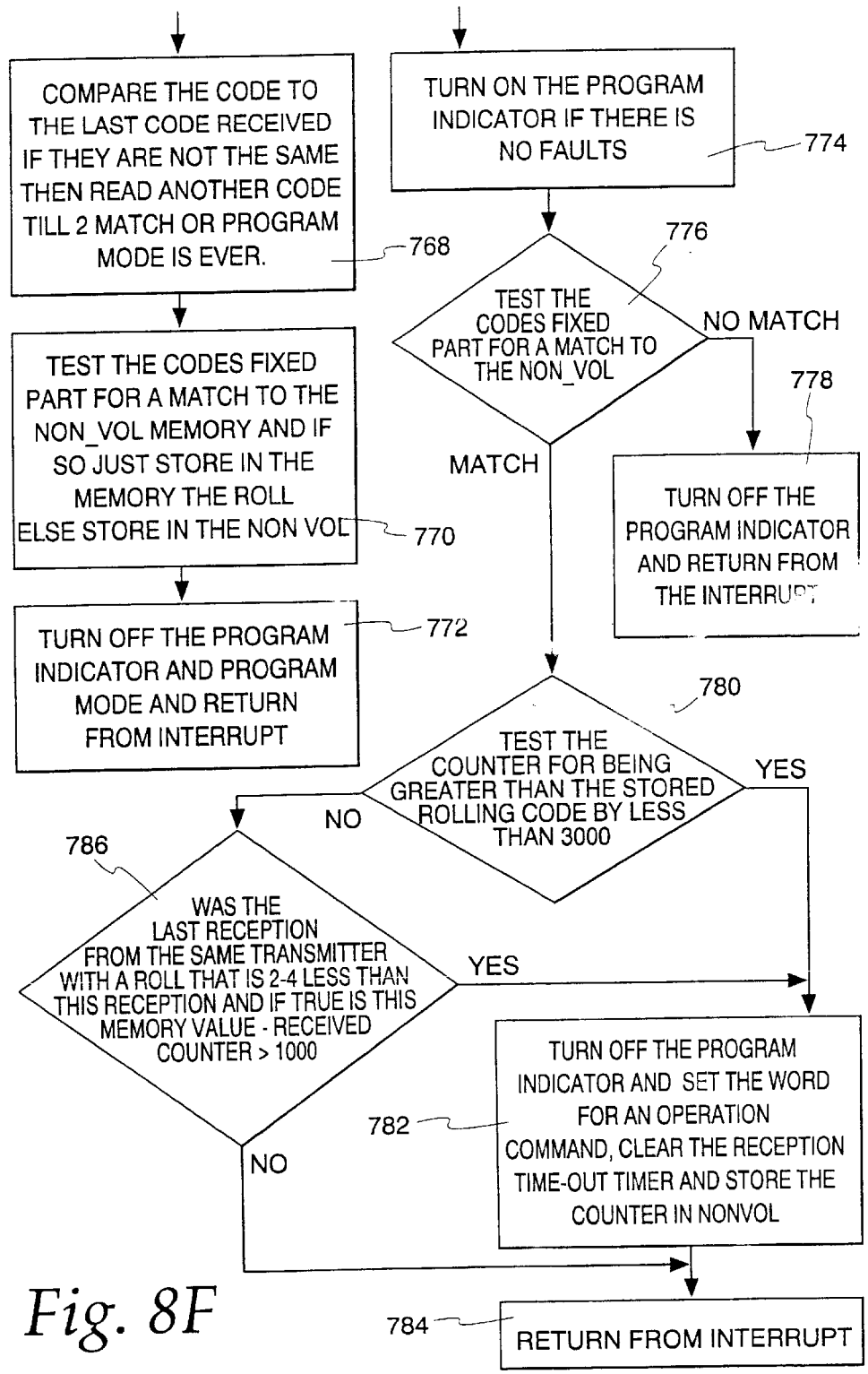

If the bit counter indicates that it is an odd number trinary bit being processed, the existing rolling code registers are multiplied by three and then the trinary bit value obtained from stews 742, 746 and 748 is added in. Whether step 750 or 752 lasers, the bit counter value is the tested in the step 754, as shown in FIG. 8E. If the bit counter value is greater than 21, the bit counter rolling code register and fixed code register are cleared in step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, as would be needed in order to get programming, then another code will be read until two successive codes match or the program mode is terminated. In a step 770, the codes are tested such that the fixed codes are tested for a match with a fixed code in non-volatile memory. If there is a match, the rolling portion is stored in the memory. If there is not, it is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is no match, the program indicator is switched off and the routine is exited in step 778. If there is a match, the counter which is indicative of the rolling code is Nested to determine whether its value is greater than the stored rolling code by a factor or difference of less than 3,000 indicating an interval of 1,000 button pushes for the transmitter. If it is not, a test is made in the step 786 to determine whether the last transmission from the same transmitter is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A transmitter comprising:
   an oscillator for generating a radio frequency oscillatory signal;
   a source of a sequence of binary codes, successive binary codes in the sequence being different from predetermined preceding binary codes in the sequence;
   trinary code generator for converting said sequence of binary codes to a sequence of trinary codes; and
   a transmitting apparatus for modulating the radio frequency oscillatory signal with the binary codes to produce a modulated trinary coded radio frequency signal.

2. The transmitter of claim 1 wherein each binary code of the sequence comprises a first portion identifying the transmitter and a second portion, the second portion comprising binary codes different from other binary codes of the sequence.

3. The transmitter of claim 2, wherein the code portions each comprise a frame length of a predetermined number of bits.

4. The transmitter of claim 2, wherein the transmitted trinary code sequence comprises a combination of the code portions.

5. The transmitter of claim 2, wherein the trinary codes in the trinary code sequence are interleaved such that alternating trinary codes are the same for each trinary code sequence transmitted by the transmitter.

6. The transmitter of claim 5, wherein the trinary code sequence is divided into two trinary code frames, each frame comprising a predetermined number of trinary codes.

7. The transmitter of claim 6, wherein each of the trinary code frames is preceded by a frame identification signal.

8. The transmitter of claim 6, wherein the transmitter is configured to reduce transmission power between transmission of each frame.

9. The transmitter of claim 7, wherein the frame identification signer indicates a start of a frame and whether the frame is a first or a second of the two frames.

10. The transmitter of claim 7, wherein the frame identification signal preceding the first frame comprises a sync bit of a first predetermined duration for signaling a receiver that a first frame is to be transmitted.

11. The transmitter of claim 10, wherein the first predetermined duration is substantially equal to 0.5 milliseconds.

12. The transmitter of claim 7, wherein the frame identification signal preceding the second frame comprises a sync bit of a second predetermined duration for signaling a receiver that a second frame is to be transmitted.

13. The transmitter of claim 12, wherein the first predetermined duration is substantially equal to 1.5 milliseconds.

14. The transmitter of claim 2 wherein the second portion of at least two successive binary codes of the sequence differ by a predetermined amount.

15. The transmitter of claim 14 wherein the second portion represents a numerical value and the numerical values of the second portions of at least two successive binary codes of the sequence differ by an amount in the range of two through four.

16. The transmitter of claim 1, wherein at least one of the code portions is stored in a memory prior to being transmitted.

17. A transmitter for authorizing access to a secure area by a control actuator receiver, comprising:
   an oscillator for generating a radio frequency oscillatory signal;
   a binary code generator for generating a sequence of binary codes, predetermined ones of the binary codes being different from others of the binary codes of the sequence;
   a trinary code generator responsive to the binary codes for generating three-valued or trinary codes; and
   a transmitting apparatus for modulating the radio frequency oscillatory signal with the trinary codes to transmit a modulated trinary coded radio frequency signal to the control actuator receiver.

18. The transmitter of claim 17, wherein successive codes are selected in accordance with a predefined code word format.

19. The transmitter of claim 18, wherein the code word format standard is in a configuration required for being recognized by the receiver.

20. The transmitter of claim 19, wherein the code word format comprises a rolling code format.

21. The transmitter of claim 17, wherein the trinary codes have bit timings corresponding to the particular trinary bit being transmitted.

22. The transmitter of claim 21, wherein a trinary bit having a zero value comprises bit timing values of substantially 1.5 milliseconds down time and 0.5 milliseconds up time.

23. The transmitter of claim 21, wherein a trinary bit having a one value comprises bit timing values of substantially 1 millisecond down time and 1 millisecond up time.

24. The transmitter of claim 21 wherein a trinary bit having a two value comprises bit timing values of substantially 0.5 milliseconds down time and 1.5 milliseconds up time.

25. The transmitter of claim 1 wherein the trinary code converter comprises circuitry for reading binary code from the binary code generator and applying the binary code so read to the transmitting apparatus with timing representing a trinary code.

26. The transmitter of claim 1 wherein the trinary code generator comprises a controller for reading code sequences from memory and conveying the code sequences so read to the transmitting apparatus.

* * * * *

UNITED STATES PATENT AND TRADEMARK OFFICE
CERTIFICATE OF CORRECTION

PATENT NO. : 6,810,123 B2
DATED : October 26, 2004
INVENTOR(S) : Farris et al.

It is certified that error appears in the above-identified patent and that said Letters Patent is hereby corrected as shown below:

Column 9,
Line 63, delete "binary" and insert -- trinary --, therefor.

Column 10,
Line 24, delete "signer" and insert -- signal --, therefor.

Signed and Sealed this

Second Day of August, 2005

JON W. DUDAS
*Director of the United States Patent and Trademark Office*